United States Patent [19]

Miutel

[11] Patent Number: 4,760,098

[45] Date of Patent: Jul. 26, 1988

[54] LOW DENSITY FOAMS

[76] Inventor: Alexander Miutel, 2007 Bloor Street West, Apt. 201, Toronto, Ontario, Canada, M6S 1M5

[21] Appl. No.: 884,075

[22] Filed: Jul. 10, 1986

Related U.S. Application Data

[63] Continuation-in-part of Ser. No. 754,256, Jul. 12, 1985, abandoned.

[51] Int. Cl.$^4$ .............................................. C08J 9/06
[52] U.S. Cl. ....................................... 521/82; 521/86; 521/110; 521/134; 521/154
[58] Field of Search ................... 521/154, 134, 82, 86, 521/110

[56] References Cited

U.S. PATENT DOCUMENTS

| | | |
|---|---|---|
| 4,189,545 | 2/1980 | Modic . |
| 4,230,820 | 10/1980 | Maschberger et al. . |
| 4,259,455 | 3/1981 | Hitchcock . |
| 4,433,069 | 2/1984 | Harper . |
| 4,459,247 | 7/1984 | Rothemund . |
| 4,476,188 | 10/1984 | Blizzard et al. . |
| 4,590,222 | 5/1986 | Bauman et al. ..................... 521/154 |
| 4,593,049 | 6/1986 | Bauman et al. ..................... 521/154 |
| 4,599,367 | 7/1986 | Bauman et al. ..................... 521/154 |
| 4,608,396 | 8/1986 | Bauman et al. ..................... 521/154 |
| 4,613,630 | 9/1986 | Bauman et al. ..................... 521/154 |

*Primary Examiner*—Morton Foelak
*Attorney, Agent, or Firm*—Finnegan, Henderson, Farabow, Garrett & Dunner

[57] ABSTRACT

Silicone flexible foams of good fire-resistance and extremely low density from about 5 to 14 lbs/ft.$^3$, having good mechanical and physical properties, are provided. The curable and foamable compositions are prepared from a multi-component mixture comprising, as part A, a high molecular weight uncured vinyl-terminated siloxane polymer, a polydimethyl silanol terminated reactive diluent, and an inorganic filler to improve fire resistance, water and a complex platinum catalyst, and as part B, a polydimethyl hydrogen siloxane. The viscosity of part A of the mixture prior to gelling and foaming is from about 30,000–65,000 cps. This mixture becomes foamable and curable at ambient temperature.

13 Claims, No Drawings

LOW DENSITY FOAMS

CROSS REFERENCE TO RELATED APPLICATION

This application is a continuation-in-part of application Ser. No. 754,256, filed July 12, 1985, now abandoned.

FIELD OF THE INVENTION

This invention relates to flexible synthetic light weight polyorganosiloxane foam materials having small percentages of carbon-carbon bonds in their polymeric chains, and having a high degree of fire resistance along with good mechanical properties, to methods for their preparation, and to component mixtures useful in their preparation.

BACKGROUND OF THE INVENTION AND PRIOR ART

Silicone plastics are commonly produced by reacting organosiloxane prepolymers or polymers in the presence of a catalyst. The organosiloxane polymer may correspond to the general formula

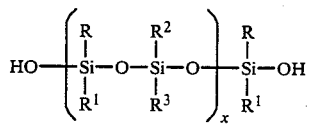

(I)

where x is an integer having a suitable value or range of values so that the polymer is a viscous liquid, and whose R, $R^1$, $R^2$, and $R^3$ are organic radicals independently selected from lower alkyl radicals and aryl radicals. The terminals hydroxyl groups may be replaced by other functional groups such as lower alkoxy (i.e. alkyl - blocked hydroxy to increase the storage stability or pot life of the polymer), hydrogen, vinyl etc. In the presence of an appropriate catalyst, functional groups on the polymers react together with elimination of water, or other appropriate end group condensation or addition reaction, to form high molecular weight polyorganosiloxane resin, thus:

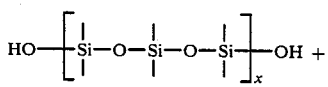

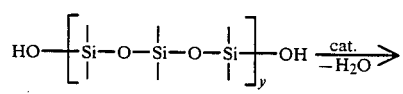

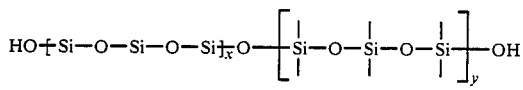

The resulting high molecular weight resins may be derived from a single organosiloxane by homopolymerization thereof, or by copolymerization of two or more organosilioxanes. The molecular weight of such silicone resins can vary over a wide range. Cross-linked resins may also be formed in this way.

It is also known to prepare foamed plastics of polyorganosiloxanes. This is accomplished by including in the polymerization mixture an organosiloxane polymer which, on condensation polymerization, releases gaseous hydrogen in situ, to act as blowing agent as the condensation polymerization proceeds. Such a compound may have the same general formula as (I) above, but in which a hydroxyl group is replaced with hydrogen.

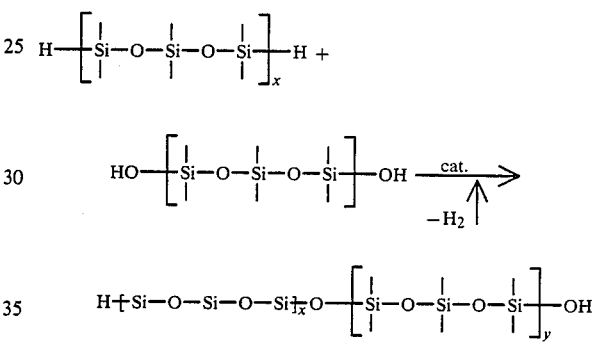

Thus silicone foams are created, with the gaseous hydrogen generated in the reaction blowing the polymerizable mixture.

Silicone foams thus prepared and having this general structure tend to be deficient in mechanical properties, especially tensile strength, flexual strength and tear strength. In order to improve these properties, it is known to provide in a silicone rubber or silicone foam a small amount of carbon-carbon bonding, e.g. by use of vinyl-terminated silicone polymers. Thus silicone rubber or silicone foam prepared from a polymer having vinyl functional groups and polymerized with organohydrogen-siloxanes, using platinum or palladium compound catalysts, has much improved physical properties, thus:

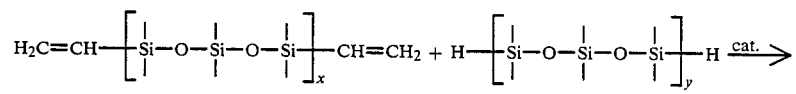

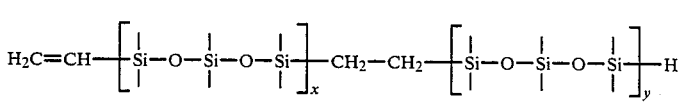

Foams can be prepared from such resins if a small amount of water and a certain excess of the hydrosiloxane (organohydrogensiloxane) is present - this is shown, for example, in U.S. Pat. No. 4,189,545 Modic. The reaction is generally as follows:

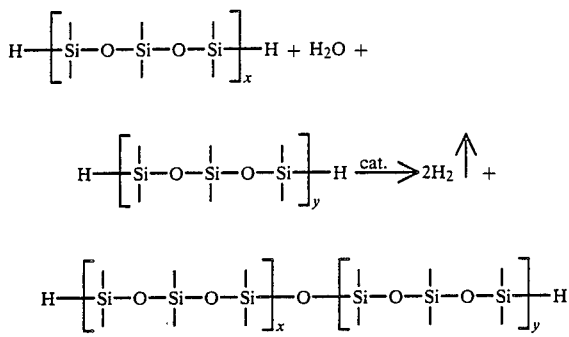

The siloxane polymeric backbone chain has a natural fire resistance. Organic substituents thereon tend to reduce the fire resistance. Accordingly, it is common to incorporate inorganic filler such as aluminum oxide, silicon dioxide, silicates, etc., into polyorganosiloxanes to obtain improvements in the fire resistance of the flexible foams thereof.

Prior art silicone foams have been limited in their utility by their relatively high density. The minimum density of silicone foam previously achieved has been about 15 lbs per cubic foot (pcf) and commonly such foams have a density in excess of 20 pcf. This restricts their uses to applications such as fire resistant insulation and fire barriers in static structures capable of withstanding heavy loads, and in electrical insulation. They cannot be used in practice in applications such as vehicle insulation, vehicle upholstery, or in aircraft, where their high degree of fire resistance and non-toxicity on subjection to heat would otherwise make them very attractive.

It is an object of the present invention to provide silicone foam from resins with vinyl unsaturation, of low density, along with processes for their preparation.

It is a further object to provide such low density silicone flexible foams which have a high degree of fire resistance, very low toxicity and acceptable mechanical properties.

BRIEF SUMMARY OF THE INVENTION

The present invention provides, from one aspect, as novel compositions of matter, extremely light weight polyorganosiloxane foam compositions, having a high degree of fire resistance, the foam compositions having a density of from about 4 to about 14 pcf, preferably 5-11 pcf. The foam compositions are cured, and exhibit other physical properties such as tensile strength, flexibility, modulus, etc. essentially equivalent to those of prior art silicone foams of much higher density. As far as is currently known, this is the first time in which flexible silicone foams of density about 14 pcf and lower, along with other acceptable physical properties, have actually been produced in a commercially feasible manner. The foam materials of the present invention are thus useful in a whole range of applications barred to previously known, higher density silicone foams.

The extremely low density polyorganosiloxane foams of the present invention are obtained by foaming and curing a multi-component polymer mixture comprising, as part A, a high molecular weight vinyl-terminated polyorganosiloxane and a low molecular weight polydimethyl silanol terminated reactive diluent, and as part B, a polydimethyl hydrogen siloxane. The mixture also includes water, inorganic filler and a platinum based curing catalyst.

The reactive diluent is carefully selected to have a hydroxyl functionally (i.e. weight percent of hydroxyl groups per molecule of reactive diluent) of from 4–6%, a viscosity in range of from about 15–35 centistokes, and a corresponding low molecular weight. It is used in amounts from about 2 to about 10 parts by weight, preferably from about 3.5 to about 7.5 parts by weight, per 100 parts by weight of combined vinyl. part A of the reactive mixture having a viscosity of from about 30,000 to about 65,000 cps at 32°–34° C. The relative amounts of water and reactive diluent in the total mixture are adjusted so that, in the foaming mixture, from about 10% to about 25% of the hydroxyl groups, on a molar basis, are contributed by the silanol reactive diluent, and from about 90% to about 75% are contributed by the water. The use of such small amounts of these correctly selected reactive diluents reduces the viscosity of the mixture down to a range from which very low density foams can be blown and cured, at approximately room temperatures, and contributes in other ways to the foaming and curing reaction. For example, it increases the gelling time, so as to allow a greater degree of foam expansion. The reactive diluent also provides a structural component of the final resin, however, so that its diluent effect of reducing viscosity is not accompanied by a serious deterioration in physical properties of the resulting resin.

The base polyorganosiloxane polymers from which the major amount of the foam according to the invention is derived, comprised in part A of the mixture, suitably contain vinyl terminal groups, and have a basic structural unit corresponding to the general formula:

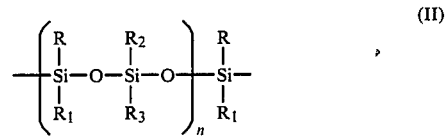

(II)

where $R$, $R_1$, $R_2$ and $R_3$ are independently selected from alkyl groups ($C_1$–$C_4$) and phenyl groups. Part B of the mixture comprises a second polyorganosiloxane which has hydrogen groups directly bonded to silicon in non-terminal positions along the siloxane chain. This second polymer may optionally have some Si—H bonds in chain-termination positions also, but suitably has unreactive lower alkyl groups as its chain termination for the most part. The first polymer, in Part A, is suitably used in weight excess of the second polymer, but the amount of Si—H bonds is preferably in molar excess of the amount of vinyl bonds in the polymer mixture. In general formula II, "n" is an integer of any suitable value giving the polymers the desired viscosity and molecular weight as hereinafter discussed, e.g. "n" in an integer from 2 to about 100, preferably 2 to about 50. Foams of resins derived from such polymers, omitting the water and reactive diluent, can be obtained, but the resulting foams are of much higher density, at least 15 pcf.

Thus the present invention comprises a viscous liquid composition suitable for use in preparing low density foam polyorgano-siloxanes in the presence of a suitable polymerization catalyst, the composition comprising an A-part and a B-part, the A-part comprising:

at least one first viscous liquid, uncured organosiloxane polymer having structural units corresponding to the general formula (II) given above and having vinyl terminal groups where R, $R_1$, $R_2$, and $R_3$ are independently selected from alkyl groups ($C_1$-$C_4$) and phenyl groups;

from 3.5–10 parts by weight, per 100 parts by total weight of part A, of a reactive polydimethyl siloxane diluent of viscosity 15–35 centistokes and a hydroxyl content of about 4–6% by weight, essentially free from carbon-carbon unsaturation, and weight in the range 1100–2000, having functionality of at least 2.5%, essentially free from carbon-carbon unsaturation, and corresponding to the general formula:

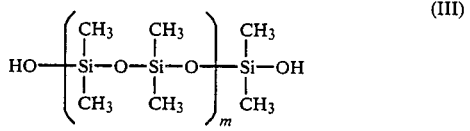
(III)

where "m" is an integer suitably chosen to give the desired molecular weight;

and water;

the composition part A having a viscosity of from about 30,000 to about 65,000 cps;

the B-part thereof comprising at least one second viscous liquid uncured organosiloxane polymer having structural units corresponding to the general formula II above in which R, $R_1$, $R_2$ and $R_3$ are independently selected from hydrogen, lower alkyl ($C_1$-$C_4$) and phenyl groups, said second polymer having a minor but significant amount of internal Si—H bonding;

the composition being capable of reaction to foam and cure under the action of a platinum based catalyst.

The presence of the polydimethylsiloxane reactive diluent reduces the viscosity of the composition, increases the degree of foam expansion during polymerization and curing, at least partly due to its action in retarding the gelling reaction, and also participates to some degree in the condensation polymerization reaction, to give a foamed polymer of low density.

(a) a first organosiloxane polymer of general formula:

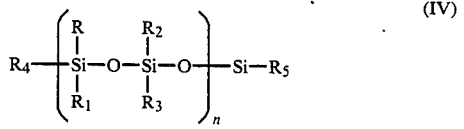
(IV)

where R, $R_1$, $R_2$ and $R_3$ are independently selected from alkyl group ($C_1$-$C_4$), and phenyl groups, and $R_4$ and $R_5$ are independently selected from hydrogen, hydroxy, blocked hydroxy and vinyl, at least some of $R_4$ and $R_5$ being vinyl;

(b) the reactive polydimethyl siloxane diluent of formula (III) defined above; and (c) a second organosiloxane polymer of general formula (IV) in which R, $R_1$, $R_2$, $R_3$, $R_4$ and $R_5$ are independently selected from hydrogen, alkyl groups ($C_1$-$C_4$), and phenyl groups, at least some of $R_2$ representing hydrogen;

(d) an inorganic filler;

(e) a small amount of water; the relative amount of siloxane diluent being from about 2–12 parts by weight per 100 parts by weight of total organosiloxane polymers;

the viscosity of the liquid mixture of components (a), (b) and (d) being within the approximate range of 30,000 to 65,000 cps;

forming a substantially homogeneous viscous liquid mixture thereof, allowing the liquid mixture to polymerize under influence of a suitable catalyst of condensation and addition polymerization to form a low density fire resistant foam, and curing the foam so formed.

DESCRIPTION OF THE PREFERRED EMBODIMENTS

The polymers preferred for use in the present invention are chosen with regard to their chemical composition and structure, to produce a foamable resin mixture of the desired characteristics. For increased flexibility in the resultant foam, it is desirable that the siloxane polymer chains therein should be essentially linear, and that the degree of cross-linking should be relatively low, even after curing. Excessive cross-linking introduces rigidity. Accordingly, it is preferred that the polymers have an essentially linear structure. Branching in the polymer chains can be present, but any such branches should preferably not contain a functional group. The second organosiloxane polymer, used in minor amount, contains internal Si—H bonds, which will react to create the necessary degree of cross-linking to cure the final foams.

The groups R, $R_1$, $R_2$ and $R_3$ in the first polymer are suitably methyl, ethyl or phenyl. The higher the proportion of methyl groups, apparently, the greater the flexibility of the resultant foam. However, the presence of aryl groups helps to increase the tensile strength of the resultant foam, which is in many cases desirable. A significant contribution to the strength properties of the final foam is made by the ethylenic bonds in the polymer chain formed from the vinyl terminal groups. These ethylenic bonds take the form

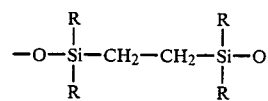

and do not involve oxygen linkages. The ethylene linkages are present in an amount sufficient to enhance the mechanical strength of the final resin, but in small enough amounts not to interfere with the inherent silicone nature of the resin, e.g. fire resistance imparted by the backbone. Accordingly, the ethylenic linkages preferably should not exceed about 3% molar of the polymer, but should preferably not be less than about 0.5% molar.

One of the significant features of the preferred embodiment of the present invention is the viscosity of the polymer mixture prior to commencing the foaming reaction. Suitable viscosity of the mixture results, in qualitative terms, in a reduction in the resistance to foaming expansion experienced within the resin, so that foaming expansion may proceed to a greater degree and produce foams of lower density. This must, however, be balanced by the factor of desirable physical properties such as tensile strength, tear strength and flexibility, in the resultant foam. Too great a degree of foam expansion would be expected to lead to excessive reduction in final strengths. Moreover, the final foamed resin should be homogeneous in structure and composition. Successful practice of the process of the present invention to produce the novel, exceptionally low density flexible silicone foams hereof depends at least in part upon the appropriate choice of basic polymers, in terms of its chemical composition, viscosity, functionality, vinyl group termination, etc., and appropriate additives for these purposes, especially the siloxane reactive diluent, in suitable amounts. The desired viscosity range is achieved by adding from 2-12 parts by weight, preferably from 3.5-7.5 parts by weight, per 100 parts by weight of polymers and inorganic fillers, of reactive diluent, so as to provide a "Part A" of the composition, namely the mixture of first organopolysiloxane, reactive diluent and filler, with a viscosity within the approximate range of 30,000-65,000 cps.

Another important property of the reactive diluent which is added to the basic composition of polymers, filler and water prior to foaming is the resultant increase in the generation of hydrogen as a blowing agent. Experimentation to find the most efficient foam expansion for purposes of the present invention has indicated that best results may be achieved when excess hydrosiloxane (hydrogen-containing second siloxane polymer) reacts with hydroxyl groups from two different sources, namely water and the hydroxyl terminated siloxane reactive diluent, especially such a reactive diluent which has hydroxyl functionality of about 4-6%. such a composition leads to the optimum balance of high foam expansion for reduced density, and good foam structure and properties.

Moreover, the rate of reaction between the hydroxyl groups of the reactive diluent and the silicon-hydrogen groups present in the polymer mixture is relatively slow, in the presence of the platinum-based catalysts used to effect the gelling and curing reactions of the mixture as it foams. This has the effect of reducing the overall rate of the gelling and curing reaction of the mixture, so that the hydrogen generation simultaneously occurring can lead to greater degrees of foam expansion. Once gelling is substantially completed and curing has commenced, further foam expansion of the resin is substantially precluded.

One specific type of suitable first siloxane polymer, with structural groups of general formula (II) above is a high molecular weight liquid polyorganosiloxane, having a high degree of linearity, essentially difunctional, and having vinyl terminal functional groups. Examples of such polymers are shown in U.S. Pat. No. 4,189,545 Modic. Such a polymer suitably has a major amount of methyl groups and can have a minor amount of phenyl groups as its R, $R_1$ etc. side groups, to impart to the final foam appropriate tensile strength and flexibility. Suitable such polymers are known and commercially available. Specific examples are the polymers commercially available from General Electric, compounded with inorganic filler, under the designations RTF-761A and RTF-762A. It is understood that RTF-762A contains water, whereas RTF-761A does not. Second organosiloxane polymers, for use as part B of the mixtures for the present invention, are also commercially available from General Electric, as "curatives", under the designations RTF-761B and RTF-762B.

The compound designated RTF-762A comprises a vinyl-terminated polyorganosiloxane as aforesaid, filled with fire resistant inorganic filler (aluminum oxide trihydrate, silica powdered quartz, calcium silicate, other metal oxides or the like) in amounts up to about 50 weight percent of polymer, and a proprietary platinum based catalyst. It also contains a small amount of emulsified water. This polymer has an average viscosity at 25° C. of around 70,000 cps. Mixed with the appropriate amount of reactive diluent, it can constitute "part A" of a composition according to the invention. Then, as "part B", of a foamable composition according to the present invention, there is suitably used a hydrogen-siloxane polymer having the appropriate amount of Si—H bonds disposed internally along the siloxane polymer chain as previously described. General Electric resin RTF-762B, referred to in trade literature as a "curing agent" and having a viscosity around 1200 cps, is a suitable specific example thereof. When such a part A is properly mixed with such a part B, e.g. in a 10:1 weight ratio, the mixture becomes curable and foamable. Foaming and gelling is usually completed in a time of from a few minutes to ½ hour, at ambient temperatures. In the absence of the reactive diluent, it produces foams of density 15-20 pcf.

Suitable reactive silanol diluents of formula III above, for the present invention, are polymerizable under influence of the same catalysts as the high molecular weight liquid polyorganosiloxane prepolymer of formula (II). One such type of reactive diluent of formula (III) above has a hydroxyl functionality of 4-6 weight percent, and low viscosity, e.g. 15-35 centistokes, and a correspondingly low molecular weight. An example of a specific such polydimethylsiloxane silanol terminated prepolymer is that designated PS-340, marketed by Petrarch Systems Inc. This compound has a specific density of 0.95 $g/cm^3$, and a viscosity at room temperatures of about 15-35 centistokes. It can be used preferably in amounts of about 3.5-10 parts by weight, most preferably about 4.5-7.5 parts by weight, based on 100 parts of filled high molecular weight polyorganosiloxane (e.g. RTF-762A), part A, and leads to cured, low density silicone foams. A second type of low viscosity silanol having a lower viscosity (15-25 cts), higher functionality (4-6%) and lower molecular weight (400-700), is exemplified by PS-399.7, from Petrarch Systems Inc. It may be used in admixture with PS-340, in amounts to give a hydroxyl functionally to the mixture of at least 5% and optimally 5-6%.

Thus the reactive diluents for use in the present invention are compatible, from both a physical and chemical point of view, with the basic polymers. They behave as solvents, to reduce the viscosity of the filled basic polymer part A into the desired range, by use of the required small amounts (preferably 4.5-7.5% by weight), so that their presence does not significantly detract from the physical strength properties of the foams derived essentially from the basic polymers. In addition, they are reactive under influence of the same catalysts, in the presence of vinyl siloxane and hydrogen siloxane polymers. In addition, they have relatively short silicone chains to ensure low viscosity and acceptable functionality, so as to delay gelling time and increase foaming ability. Moreover they are unreactive with vinyl terminated basic polymers, but will incorporate chemically into the foam structure on reaction with the hydrogen siloxane, generating hydrogen for foaming purposes.

As noted above, water is included in the polymer mixture prior to foaming, to increase hydrogen generation during subsequent reaction. The water is suitably used in amounts from 5-12 parts by weight per 100 parts of hydrogen siloxane (second base polymer), preferably from 5-8 parts by weight. Since the water is not compatible with the polymers, it is preferred to emulsify it by high speed mixing with one of the organosiloxane polymers, preferably the vinyl terminated polymer, and add the emulsion so formed. The water should be fully and evenly dispersed throughout the resin mixture, to obtain full enhancement of the foaming characteristics thereby. Lower alkanols, such as methanol, may also be added along with the water, but these are not essential.

The foamable, curable mixtures according to the preferred embodiments of this invention, thus conain vinyl terminated polyorganosiloxanes, Si—H group-containing polyorganosiloxanes, and two sources of reactive hydroxyl groups, namely water and the silanol terminated reactive diluent. The following reactions thus take place during the gelling, foaming and curing processes:

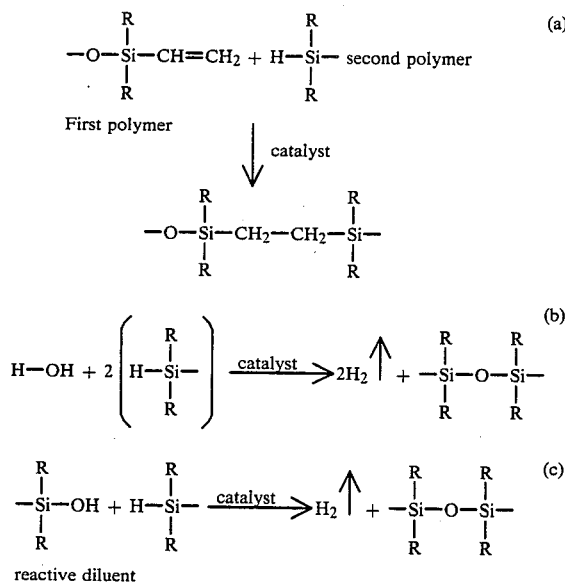

Reaction (a) is the fastest, but generates no gaseous blowing agent. All three reactions proceed simultaneously to give a cured, foamed product incorporating all of the above reaction products. Reaction (b) generates the greatest amount of gaseous blowing reagent for foaming purposes. Reaction (c), involving the reactive diluent, also generates gaseous blowing agent, with the reactive diluent incorporating into the cured resin structure. It is a feature of the preferred aspects of the present invention that hydroxyl groups for the gelling, foaming and curing reactions are derived from both water and the reactive diluent silanol, in molar quantities of 75-90% from water and correspondingly 25-10% from silanol, so that these three reactions may proceed in proper balance with one another to produce the foamed resins of the present invention. Otherwise, foams of the prescribed low density and high physical properties are not obtained.

The viscosity values reported herein are as measured at ambient temperatures (c25° C.). The required viscosities in the foamable mixtures are obtained by mixing the ingredients at room temperatures.

The compositions according to the invention also include inorganic fillers to enhance the fire resistance of the final flexible foams, or for coloring. The suitable fillers are incorporated into the polymer mixture before polymerization and foaming is commenced. Appropriate such fillers include alumina and hydrates thereof, silica, calcium silicate, manganese oxides, iron oxides and the like, as known in the prior art. The filler is suitably present in amounts from about 35-50 parts by weight in 100 parts by weight of total polymers, and is thoroughly dispersed in the mixture.

Other additives which may be included in the polymerizable mixture include nucleation agents to assist in foam formation. These materials, which are known in the art, include ultrafine fumed silica gel, finely ground graphite or titanium dioxide etc., and are used in very small amounts.

The process of preparing the foams of the present invention involves the formation of a substantially homogeneous mixture of the ingredients, including catalyst and foaming polymerization thereof at temperatures preferably in the 18°-35° C. range. Care should be taken to ensure that the temperature during mixing does not exceed about 35° C., or premature gelling and curing may occur. Normally, room temperature polymerization is satisfactory. The polymerization may take place in a mold vessel, providing adequate space for foam expansion. Alternatively, the mixture may be formed in a spray head and spray applied to a supporting surface, to allow foaming polymerization thereon into slabs or sheets of the desired thickness. It is an advantageous feature of the process of the present invention that the foaming reaction takes place without supply of external heating or cooling, on mixing the ingredients at ambient, room temperatures. The only supplied heat is derived from the mixing together of the ingredients, or the chemical reaction. The foam is then cured, to a non-tacky, flexible condition. Curing may take place at room temperature, merely by allowing the foam to stand for an appropriate period of time after foaming in covered molds. The curing process may, if desired, be accelerated by warming the foam. It is preferred to allow at least the initial curing to proceed at room temperature, or at any rate below 35° C., to improve the homogeneity of the foam. After about 30 minutes curing at room temperatures, the cure is advantageously completed at slightly elevated temperatures (50°-70° C.) for about 2 hours. Complete curing at room temperatures, to produce a tack free product may take about 72 hours.

Preferred foams according to the invention have sufficient fire resistance to pass standard oil burner tests for flammability. Fumes and smoke therefrom are substantially non-toxic, sufficient to pass Boeing test BSS 7239 for toxicity and London Underground test for smoke emission.

The invention is further illustrated in the following specific examples. Unless otherwise stated, all ingredients are listed in parts by weight.

EXAMPLE 1

The following three ingredients were thoroughly mixed together in an open-topped vessel, to form a homogeneous viscous liquid mix:

Part A:

| | |
|---|---|
| Silicone filled polymer mix RTF-761A, containing proprietary platinum based catalyst (also designated RTV 285-1233A) from General Electric | 92.5 parts |
| Low viscosity polydimethylsiloxane silanol PS 340 | 7.5 parts |

-continued

| | |
|---|---|
| Aqueous methanol (alcohol:water 1:1) | 1.0 parts |

Then, as Part B, 10 parts of hydrogen-containing siloxane polymer, RTF-761B from General Electric, was thoroughly mixed in. The mixture was poured into an open mold and allowed to foam and gel at ambient temperature (about 25° C.). The gelling time was about 26–28 minutes. A sample was placed in an oven at 60° C. and cured for 30 minutes. There was produced a flexible, resilient, soft silicone foam, of density 10.4 pcf, tensile strength 12.5–13 psi and flame spread index of 21. The foam had a homogeneous structure, with medium-small size cells.

EXAMPLE 2

In this example, the foam was produced on a semi-industrial scale, to produce a cured sample of size 24"×22"×5.5". The following formulation was used:

| | |
|---|---|
| Part A: | |
| RTF-762A (General Electric) | 94.0 parts |
| PS 340 | 4.8 parts |
| PS 339.7 | 1.2 parts |
| Part B: | |
| Modified RTF-762B containing 8% water | 13.0 parts |

The ingredients were blended with an electric hand mixer, the temperature being thereby raised to about 33° C. The components of the reactive diluent, PS 340 and PS 339.7 from Petrarch, were pre-mixed in the above 4:1 ratio, giving an average hydroxyl functionality of about 3%. The water component of RTF-762B was emulsified therein.

The cured, foamable mixture was gelled in a covered, insulated mold, over a period of about 18 minutes. Then the mold was opened and placed in an oven at 60°-70° C. for 15 minutes to cure the foam. The resultant flexible foam had good cell structure and a density of 5–5.2 pcf.

EXAMPLE 3

A laboratory foam sample was made by the procedure of Example 1 from the following formulation:

| | |
|---|---|
| RTF-762A | 93.5 parts |
| PS 340 | 6.5 parts |
| RTF-762B containing 5% water | 14.0 parts |

The first two items were mixed and warmed in an oven to 31° C. Then the RTF-762B containing water was added and rapidly blended in. The mixture was poured into an insulated paper mold and covered. The mold was left at ambient temperature and gelling occurred in 13–14 minutes. The foam was cured in the oven at 50° C. for 25 minutes. The resultant cured flexible foam had a density of 7.7. pcf and good structure.

EXAMPLE 4

Silicone foams, according to the invention, were prepared on a laboratory scale from polymers RTF-761A and B, and and RTF-762A and B, described previously, with various amounts of reactive diluent PS-340 and appropriate catalysts. No additional inorganic filler was used, other than that contained in the polymers as commercially obtained. In these laboratory preparations, the resin compositions were mixed together in a cardboard, open-topped container of about 250 ml capacity, stirring with a wooden stirrer to form a homogeneous mixture. Then they were poured into paper molds and allowed to foam and cure, to produce foam samples of size about 20–25 cubic inches.

Further samples were prepared similarly, but on a semi-industrial scale, by mixing the ingredients in a vessel with a mechanical hand mixer and then pouring into a mold to cure and form foam samples of size 14–24 inches by 14–24 inches by 4–6 inches.

Further such samples were prepared similarly, but on an industrial scale, producing foam slabs of size 3 feet×6 feet×6 inches thick. In the industrial preparations, automatic air-excluding mixes were used to prepare the foamable compositions, to a high degree of homogeneity, with automatic ingredient proportioning and pouring into the the shallow slab molds.

The conditions and results are given below in Table 1.

TABLE 1

| Silicone Prepolymer | | Reactive Diluent | | Curative Part B | | Foam Density Achieved (pcf) | | |
|---|---|---|---|---|---|---|---|---|
| Designation | Parts by wt | Designation | Parts by wt | Designation | Parts by wt | Lab | Semi-Indust. | Industrial |
| RTF-761 | 95 | PS-340 | 5 | 761 B | 10 | 8.5–9.0 | 7.8–8.4 | 7.2–7.6 |
| RTF-762 | 94 | PS-340 | 6 | 762 B | 11 | 7.9–9.2 | 6.5–7.0 | 6.3–7.0 |
| RTF-762 | 93 | PS-340 | 7 | 762 B | 12 | 7.6–8.6 | 5.2–5.9 | — |

The above figures are derived from several repeated samples. Some variation in composition and performance is noted between batches of the same commercially available resins.

EXAMPLE 5

Forms were prepared in accordance with the present invention from the commercially available RTF-761A and B, and RTF-762A and B, organosiloxane prepolymers, and reactive diluent PS-340 previously described. Manufacturers' recommended proprietary catalysts for the respective prepolymers were used. Small amounts of water were included in each foaming formulation - prepolymer RTF-762A contains a little water in its composition whereas RTF-761 does not. However, the curative 761-B, used with resin RTF-761A, includes a small amount of water. Accordingly, each of the formulations contained about 8 parts of water per 100 parts by weight of curative 761-B. Mixing, foaming and curing took place in an open-topped vessel, and the viscosity of the mixture was measured after homogeneous mixing, but before addition of the curative 761-B.

The formulations and results are given below in Table 2. It is to be noted that the reported properties of viscosity and density are averages of several formulations, since minor variations were encountered between specific prepolymer batches and reactive diluent batches.

TABLE 2

| A-part-Vinyl Terminated Siloxane Polymer with filler | | Reactive Diluent | B-part-Hydrogen Containing Siloxane Polymer (Curing Agent) | | Viscosity of Mix at 76° F. (cps) | Foam Density (lbs per cu. ft) |
|---|---|---|---|---|---|---|
| Designation | Amount (parts by wt) | Amount (parts by wt) | Designation | Amount (parts by wt) | | |
| RTF-761 | 100 | — | 761 B | 10 | c.70,000 | 19.5-20 |
| RTF-761 | 96.5 | 3.5 | 761 B | 10 | 59,400 | 14.5 |
| RTF-761 | 95.0 | 5.0 | 761 B | 10 | 53,000 | 8.5-9.0 |
| RTF-761 | 92.5 | 7.5 | 761 B | 10 | 56,000 | 10.0 |
| RTF-761 | 90.0 | 10.0 | 761 B | 10 | 58,000 | 10.5 |
| RTF-762 | 100 | — | 762 B | 11 | 69,600 | 16.5-18 |
| RTF-762 | 96.25 | 3.75 | 762 B | 11 | 52,200 | 11.5 |
| RTF-762 | 96 | 4.0 | 762 B | 11 | 50,400 | 9.8 |
| RTF-762 | 95 | 5.0 | 762 B | 11 | 47,500 | 9.1 |
| RTF-762 | 94 | 6.0 | 762 B | 11 | 47,200 | 8.5 |
| RTF-762 | 93.5 | 6.5 | 762 B | 11 | 48,900 | 8.1 |
| RTF-762 | 93 | 7.0 | 762 B | 11 | 48,200 | 7.5 |
| RTF-762 | 92.5 | 7.5 | 762 B | 11 | 48,000 | 7.2 |

The viscosity measurements reported in Table 2 were actually made on the mixture of A-part and reactive diluent, but the addition of the B-part makes no significant difference to the viscosity of the foamable mixture.

It will be noted, in general, that the lower the viscosity of the part A-reactive diluent mixture, the lower the density of the resultant foam. There are, however, significant variations between batches of polymers, and experimentation may be necessary with each polymer batch to find the optimum viscosity and formulation for preparing the best foam.

What is claimed is:

1. A viscous liquid composition suitable for use in preparing low density foam polyorganosiloxanes, the composition comprising an A-part and a B-part:

the A part consisting essentially of:
(A1) at least one viscous liquid high molecular weight uncured vinyl terminated siloxane polymer of the general formula:

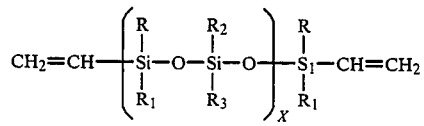

where R, $R_1$, $R_2$ and $R_3$ are independently selected from C1-C4 alkyl groups and phenyl groups, and X is an integer of suitable value or range of values so that the polymer is a viscous liquid of viscosity greater than 30,000 cps at 32°-34° C.;

(A2) at least one reactive polydimethyl siloxane diluent of viscosity 15-35 centistokes and hydroxyl content of 4-6% by weight, essentially free from carbon-carbon unsaturation and corresponding to the general formula III where "m" is an integer suitably chosen to provide a compound of the specified viscosity:

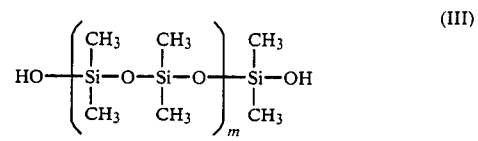

(A3) water; the relevant amounts of water (A3) and reactive diluent (A2) being such that 75-90 mole percent of hydroxyl groups in the composition are derived from water (A3) and correspondingly 25-10% thereof from the reactive diluent (A2);

(A4) a complex platinum catalyst;

the B part consisting essentially of:
(B5) at least one second viscous liquid uncured organosiloxane polymer having the general formula:

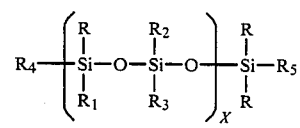

in which R, $R_1$, $R_2$, $R_3$, $R_4$ and $R_5$ are independently selected from hydrogen, alkyl groups (C1-C4) and phenyl groups, at least some of $R_2$ representing hydrogen;

the composition also including (6) an inorganic filler; the amount of said at least one reactive diluent (A2) being from 2-10 parts by weight, per 100 parts by total weight of said vinyl terminated siloxane polymer (A1) an inorganic filler (6);

the viscosity of the A-part of the composition being from about 30,000 to about 65,000 cps;

the relative amounts of ingredients in the A-part being adjusted within the said ranges so as to give a composition foamable under the action of the complex platinum catalyst (A4) and curable to give a cured foam polyorganosiloxane of density not greater than 14 pcf.

2. The composition of claim 1 wherein the groups R, $R_1$, $R_2$ and $R_3$ in the vinyl terminated siloxane polymer (A1) are selected from methyl, ethyl and phenyl.

3. The composition of claim 2 wherein the groups R, $R_1$, $R_2$ and $R_3$ in the second organosiloxane polymer (B5) are selected from hydrogen, methyl, ethyl and phenyl.

4. The composition of claim 3 wherein the vinyl terminated siloxane polymer (A1) is present in weight excess over the second organosiloxane polymer (B5).

5. The composition of claim 4 wherein the organosiloxane polymer mixture contains a molar excess of Si—H bonds over vinyl bonds.

6. The composition of claim 5 wherein the amount of reactive diluent is from about 4.5-7.5 parts by weight, per 100 parts by weight of vinyl terminated siloxane polymer (A1) and inorganic filler (6).

7. The composition of claim 1 wherein the amount of water is from about 5-12 parts by weight per 100 parts of second organosiloxane polymer (B5).

8. The composition of claim 1 wherein the inorganic filler (6) is present in amounts from 35-100 parts by weight, per 100 parts by weight of vinyl terminated siloxane polymer (A1).

9. A process for preparing low density flexible silicone foams of density in the range 5–15 pcf, which comprises preparing, by mixing at a temperature not exceeding 35° C., a viscous liquid composition comprising:

(A1) at least one first viscous liquid high molecular weight uncured vinyl terminated siloxane polymer of the general formula:

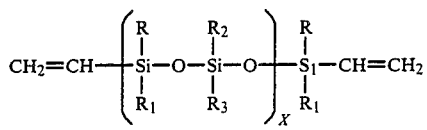

wherein R, $R_1$, $R_2$ and $R_3$ are independently selected from C1–C4 alkyl groups and phenyl groups, and X is an integer of suitable value or range of values so that the polymer is a viscous liquid of viscosity greater than 30,000 cps at 32°–34° C.;

(A2) at least one reactive polydimethyl siloxane diluent of viscosity 15–35 centistokes and a hydroxyl content of 4–6% by weight, essentially free from carbon-carbon unsaturation, and corresponding to the general formula III where "m" is an integer suitably chosen to provide a compound of the specified viscosity:

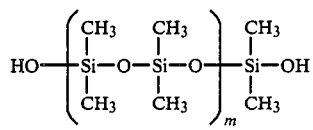

(A3) water;
(A4) a complex platinum catalyst;
(B5) at least one second viscous liquid uncured organosiloxane polymer having the general formula:

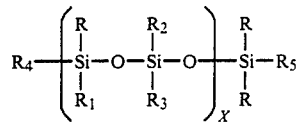

in which R, $R_1$, $R_2$, $R_3$, $R_4$ and $R_5$ are independently selected from hydrogen, alkyl groups (C1–C4) and phenyl groups, at least some of $R_2$ representing hydrogen;

(6) an inorganic filler;
the amount of reactive diluent (A2) being from 2–10 parts by weight per 100 parts by total weight of vinyl terminated siloxane polymer (A1) an inorganic filler (6);
the viscosity of the mixture of components (A1), (A2), (A3), and (6) being from 30,000 to about 65,000 cps;
the relative amounts of water (A3) and reactive diluent (A2) being such that 75–90 mole percent of hydroxyl groups in the composition are derived from water (A3) and correspondingly 25–10% thereof from the reactive diluent (A2);
causing the mixture to react and foam under the influence of the complex platinum catalyst;
and curing the resultant foam so as to reduce a low density flexible silicone foam of density in the range 5–14 pcf.

10. The process of claim 9 wherein the groups R, $R_1$, $R_2$, and $R_3$ in the vinyl terminated siloxane polymer are selected from methyl, ethyl and phenyl.

11. The composition of claim 10 wherein the groups R, $R_1$, $R_2$ and $R_3$ in the second organosiloxane polymer (B5) are selected from hydrogen, methyl, ethyl and phenyl.

12. The process of claim 10 wherein the vinyl terminated siloxane polymer (A1) is present in the composition in weight excess over the second organosiloxane polymer (B5).

13. The process of claim 11 wherein the organosiloxane polymer mixture contains a molar excess of Si—H bond over vinyl bonds.

* * * * *